(12) United States Patent
Chung et al.

(10) Patent No.: US 8,830,931 B2
(45) Date of Patent: Sep. 9, 2014

(54) METHOD FOR TRANSMITTING SOUNDING REFERENCE SIGNALS IN A WIRELESS COMMUNICATION SYSTEM, AND APPARATUS FOR SAME

(75) Inventors: Jae Hoon Chung, Anyang-si (KR); Yeong Hyeon Kwon, Anyang-si (KR); Min Seok Noh, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 13/257,960

(22) PCT Filed: Mar. 22, 2010

(86) PCT No.: PCT/KR2010/001748
§ 371 (c)(1),
(2), (4) Date: Sep. 20, 2011

(87) PCT Pub. No.: WO2010/110566
PCT Pub. Date: Sep. 30, 2010

(65) Prior Publication Data
US 2012/0008588 A1 Jan. 12, 2012

Related U.S. Application Data

(60) Provisional application No. 61/162,323, filed on Mar. 22, 2009, provisional application No. 61/180,424, filed on May 21, 2009, provisional application No. 61/182,749, filed on May 31, 2009, provisional application No. 61/244,424, filed on Sep. 21, 2009.

(51) Int. Cl.
| | | |
|---|---|---|
| H04L 5/06 | (2006.01) | |
| H04B 7/06 | (2006.01) | |
| H04L 5/00 | (2006.01) | |
| H04W 92/00 | (2009.01) | |

(52) U.S. Cl.
CPC ............ *H04B 7/0684* (2013.01); *H04L 5/0023* (2013.01); *H04L 5/0048* (2013.01); *H04W 92/00* (2013.01)
USPC ........... 370/329; 370/206; 370/210; 370/252; 370/280; 370/474

(58) Field of Classification Search
CPC .. H04B 7/0613; H04B 7/0684; H04L 5/0023; H04L 5/0048; H04W 92/00
USPC ......... 370/276, 310, 203, 206, 210, 252, 280, 370/328, 329, 331, 474
See application file for complete search history.

(56) References Cited

U.S. PATENT DOCUMENTS 7,848,385 B2 * 12/2010 Nakao et al. ................... 375/130
7,885,211 B2 * 2/2011 Shen et al. ..................... 370/278
(Continued)

FOREIGN PATENT DOCUMENTS

| KR | 1020080069753 | 7/2008 |
| KR | 1020080073028 | 8/2008 |
| KR | 1020080096336 | 10/2008 |

*Primary Examiner* — Andrew Chriss
*Assistant Examiner* — Rasha Fayed
(74) *Attorney, Agent, or Firm* — Lee, Hong, Degerman, Kang & Waimey

(57) ABSTRACT

The present invention relates to a method in which a user equipment transmits a plurality of sounding reference signals to a base station in a wireless communication system. More particularly, the method comprises the steps of: generating a plurality of sounding reference signals on the basis of repetition factors (RPFs) corresponding to the number of transmitting antennas; multiplexing the plurality of sounding reference signals to a frequency domain in the same OFDM symbol or SC-FDMA symbol on the basis of a transmitting antenna index; and transmitting the multiplexed sounding reference signals to the base station using a plurality of transmitting antennas.

10 Claims, 14 Drawing Sheets

(56) References Cited

U.S. PATENT DOCUMENTS

| | | | |
|---|---|---|---|
| 8,102,809 B2* | 1/2012 | Muharemovic et al. | 370/330 |
| 8,126,076 B2* | 2/2012 | Sartori et al. | 375/267 |
| 8,259,631 B2* | 9/2012 | Hwang et al. | 370/310 |
| 8,284,725 B2* | 10/2012 | Ahmadi | 370/329 |
| 8,295,874 B2* | 10/2012 | Harris et al. | 455/522 |
| 2007/0171849 A1* | 7/2007 | Zhang et al. | 370/310 |
| 2008/0225788 A1* | 9/2008 | Inoue et al. | 370/329 |
| 2008/0268860 A1* | 10/2008 | Lunttila et al. | 455/450 |
| 2008/0298497 A1 | 12/2008 | Cho et al. | |
| 2008/0318608 A1* | 12/2008 | Inoue et al. | 455/509 |
| 2009/0046645 A1* | 2/2009 | Bertrand et al. | 370/329 |
| 2009/0109908 A1* | 4/2009 | Bertrand et al. | 370/329 |
| 2009/0245148 A1* | 10/2009 | McCoy | 370/310 |
| 2010/0041350 A1* | 2/2010 | Zhang et al. | 455/101 |
| 2010/0098042 A1* | 4/2010 | Dent | 370/342 |
| 2010/0215114 A1* | 8/2010 | Kim et al. | 375/267 |
| 2011/0096707 A1* | 4/2011 | McCoy et al. | 370/310 |
| 2011/0299449 A1* | 12/2011 | kwon et al. | 370/312 |
| 2012/0140687 A1* | 6/2012 | Nakao et al. | 370/310 |
| 2013/0016684 A1* | 1/2013 | Attar et al. | 370/329 |
| 2013/0129001 A1* | 5/2013 | Sakata et al. | 375/267 |

* cited by examiner (a) Control-plane protocol stack (b) User-plane protocol stack All required number (=M) of SRSs is individually multiplexed to each allocated SRS transmission bandwidth All required number (=M) of SRSs is individually multiplexed to each pair of allocated (total of N) SRS transmission bandwidths and (total of P) cyclic shifts. N*P is equal to or greater than M. Each SRS may be allocated in a code-first manner or band-first manner.

METHOD FOR TRANSMITTING SOUNDING REFERENCE SIGNALS IN A WIRELESS COMMUNICATION SYSTEM, AND APPARATUS FOR SAME

CROSS-REFERENCE TO RELATED APPLICATIONS

This application is a 371 U.S. national stage application of International Application No. PCT/KR2010/001748, filed on Mar. 22, 2010, which claims priority to U.S. Provisional Application Ser. Nos. 61/244,424, filed on Sep. 21, 2009, 61/182,749, filed on May 31, 2009, and 61/180,424, filed on May 21, 2009, and 61/162,323, filed on Mar. 22, 2009, the contents of which are incorporated by reference herein in their entirety.

TECHNICAL FIELD

The present invention relates to a wireless communication system, and more particularly, to a method for transmitting a plurality of sounding reference signals to a base station at a user equipment in a wireless communication system, and an apparatus therefor.

BACKGROUND ART

As an example of a mobile communication system to which the present invention is applicable, a 3rd Generation Partnership Project Long Term Evolution (hereinafter, "LTE") communication system is described in brief.

FIG. 1 is a diagram schematically showing a network structure of an E-UMTS as an exemplary radio communication system. An Evolved Universal Mobile Telecommunications System (E-UMTS) is a system evolving from a conventional Universal Mobile Telecommunications System (UMTS) and basic standardization task thereof is currently underway in the 3GPP. The E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE) 120, e Node Bs (eNBs) 110a and 110b, and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is set to use one of bandwidths of 1.25, 2.5, 5, 10, and 20 MHz to provide a downlink or uplink transport service to several UEs. Different cells may be set to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), the demands and expectations of users and providers continue to increase. In addition, since other radio access technologies continue to be developed, new technical evolution is required to secure competitiveness in the future. For example, decrease of cost per bit, increase of service availability, flexible use of a frequency band, simple structure, open interface, and suitable power consumption by a UE are required.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier.

DETAILED DESCRIPTION OF THE INVENTION

Technical Problems

An object of the present invention is to provide a method for transmitting a plurality of sounding reference signals to a base station at a user equipment in a wireless communication system, and an apparatus therefor.

The technical objects to be achieved by the present invention are not limited to the above-mentioned technical objects, and other technical problems not mentioned above can be clearly understood by one skilled in the art from the following description.

Technical Solutions

According to one aspect of the present invention, a method for transmitting a plurality of sounding reference signals at a user equipment in a wireless communication system includes generating a plurality of sounding reference signals based on a Repetition Factor (RPF) corresponding to the number of transmission antennas; multiplexing the plurality of sounding reference signals to a frequency axis in the same OFDM symbol or SC-FDMA symbol based on a transmission antenna index; and transmitting the multiplexed sounding reference signals to a base station using a plurality of transmission antennas.

The RPF may be 2·L (where L is the number of transmission antennas) or 2·{floor(L/4)+1} (where L is the number of transmission antennas).

The multiplexing may include allocating discontinuously clustered frequency resources to the plurality of sounding reference signals in the same OFDM symbol or SC-FDMA symbol. Base sequences or cyclic shift values of each of the plurality of sounding reference signals may be different from each other.

According to another aspect of the present invention, a method for transmitting a plurality of sounding reference signals at a user equipment in a wireless communication system includes determining available cyclic shift values based on a delay spread value of an uplink channel; code division multiplexing the plurality of sounding reference signals to a frequency axis of the same OFDM symbol or SC-FDMA symbol using the available cyclic shift values; and transmitting the multiplexed sounding reference signals to a base station, wherein the number of the available cyclic shift values is equal to or greater than the number of the sounding reference signals, and wherein the base station is one of a micro base station, a pico base station, and a femto base station.

The cyclic shift value ($\alpha$) may be determined by $$\alpha = 2\pi \frac{n_{SRS}^{cs}}{N}$$

where $n_{SRS}^{cs}$ is a value configured for each user equipment by higher layers and has an integer of 0 to N−1, and N denotes the number of the cyclic shift values. The number (N) of the cyclic shift values may be determined by:

$$N = \text{floor}\left(\frac{\text{symbol periodicity}}{\text{maximum delay spread}}\right)$$

or $$N = \text{floor}\left(\frac{\text{symbol periodicity}}{\text{RMS of delay spread}}\right).$$

According to still another aspect of the present invention, a user equipment includes a processor for generating a plurality of sounding reference signals based on a Repetition Factor (RPF) corresponding to the number of transmission antennas and multiplexing the plurality of sounding reference signals to a frequency axis in the same OFDM symbol or SC-FDMA symbol based on a transmission antenna index; and a transmission module for transmitting the multiplexed sounding reference signals to a base station using a plurality of transmission antennas.

The RPF may be 2·L (where L is the number of transmission antennas) or 2·{floor(L/4)+1} (where L is the number of transmission antennas).

The processor may allocate discontinuously clustered frequency resources to the plurality of sounding reference signals in the same OFDM symbol or SC-FDMA symbol. Base sequences of each of the plurality of sounding reference signals or cyclic shift values may be different from each other.

According to a further aspect of the present invention, a user equipment includes a processor for determining available cyclic shift values based on a delay spread value of an uplink channel and code division multiplexing the plurality of sounding reference signals to a frequency axis of the same OFDM symbol or SC-FDMA symbol using the available cyclic shift values; and a transmission module for transmitting the multiplexed sounding reference signals to a base station, wherein the number of the available cyclic shift values is equal to or greater than the number of the sounding reference signals, and wherein the base station is one of a micro base station, a pico base station, and a femto base station.

The cyclic shift value ($\alpha$) may be determined by $$\alpha = 2\pi \frac{n_{SRS}^{cs}}{N}$$

where $n_{SRS}^{cs}$ is a value configured for each user equipment by higher layers and has an integer of 0 to N−1, and N denotes the number of the cyclic shift values. The number (N) of the cyclic shift values may be determined by:

$$N = \text{floor}\left(\frac{\text{symbol periodicity}}{\text{maximum delay spread}}\right)$$

or $$N = \text{floor}\left(\frac{\text{symbol periodicity}}{\text{RMS of delay spread}}\right).$$

Advantageous Effects

According to the embodiments of the present invention, a user equipment can effectively transmit sounding reference signals in a wireless communication system to which carrier aggregation is applied.

The effects which can be obtained from the present invention are not limited to the above-mentioned effects, and other effects not mentioned above can be clearly understood by one skilled in the art from the following description of the embodiments of the present invention.

BEST MODE FOR CARRYING OUT THE INVENTION

Hereinafter, structures, operations, and other features of the present invention will be understood readily from the embodiments of the present invention, examples of which are illustrated in the accompanying drawings. Embodiments described later are examples in which technical features of the present invention are applied to a 3GPP system.

Hereinafter, a system that includes a system band of a single frequency block will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as the system block of the legacy system. On the other hand, there is no limitation as to the sizes of the other frequency blocks. However, for system simplification, the sizes of the other frequency blocks may be determined based on the size of the system block of the legacy system. For example, the 3GPP LTE (Release-8) system and the 3GPP LTE-A (Release-9) system are legacy system and evolved system relations.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiments of the present invention will be described based on the LTE system and the LTE-A system, the LTE system and the LTE-A system are only exemplary and the embodiments of the present invention can be applied to all communication systems corresponding to the aforementioned definition. Also, although the embodiments of the present invention will herein be described based on FDD mode, the FDD mode is only exemplary and the embodiments of the present invention can easily be applied to H-FDD mode or TDD mode.

Figure 1:
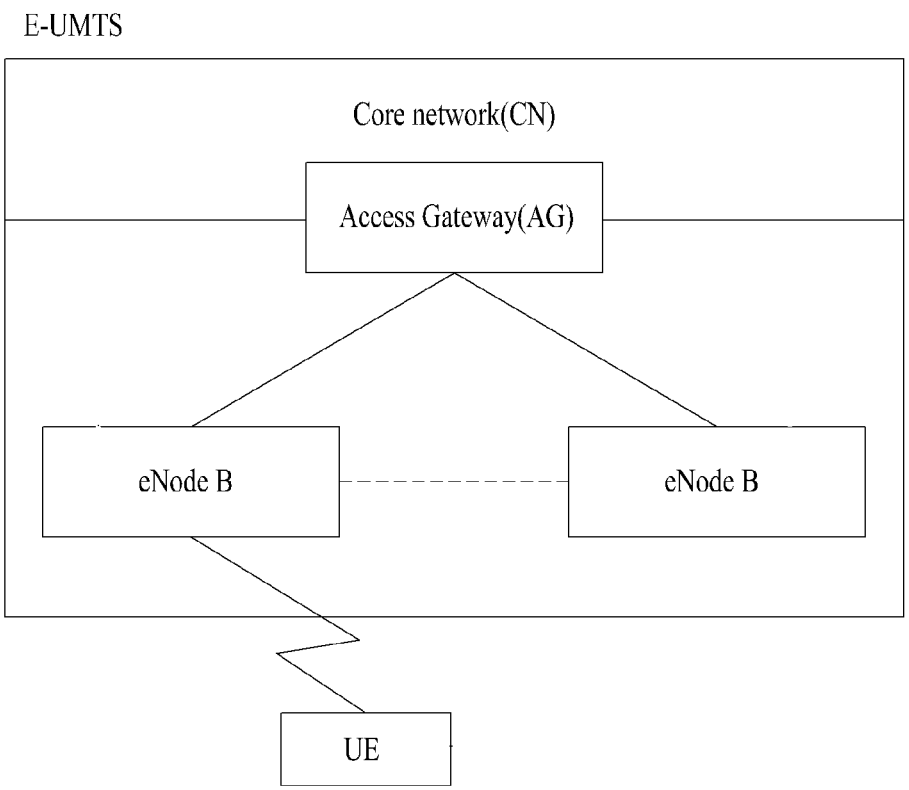
FIG. 1 is a diagram schematically showing a network structure of an E-UMTS as an exemplary radio communication system.
Figure 2:
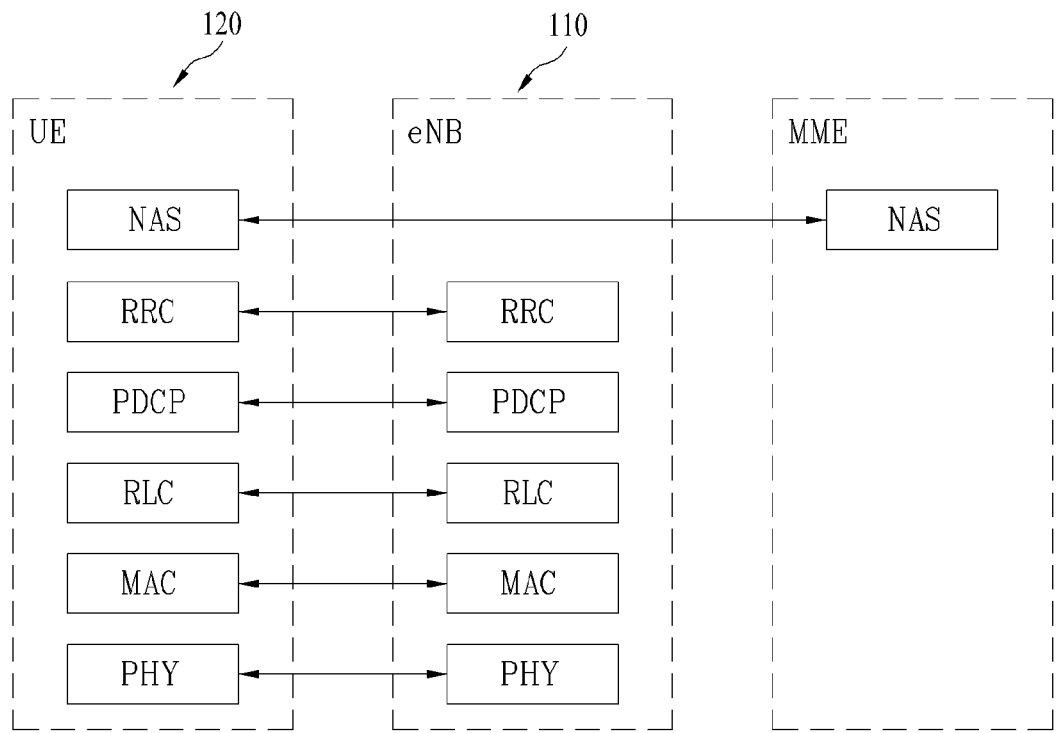
FIG. 2 is a diagram showing structures of a control plane and a user plane of a radio interface protocol between a UE and an E-UTRAN based on the 3GPP radio access network specification.
Figure 2:
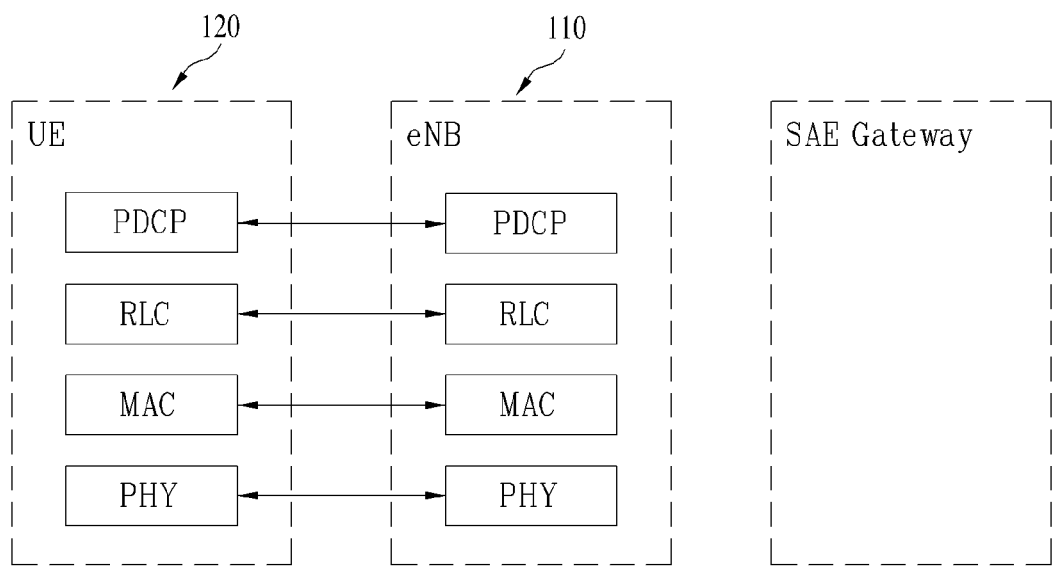

FIG. 2 is a diagram showing structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
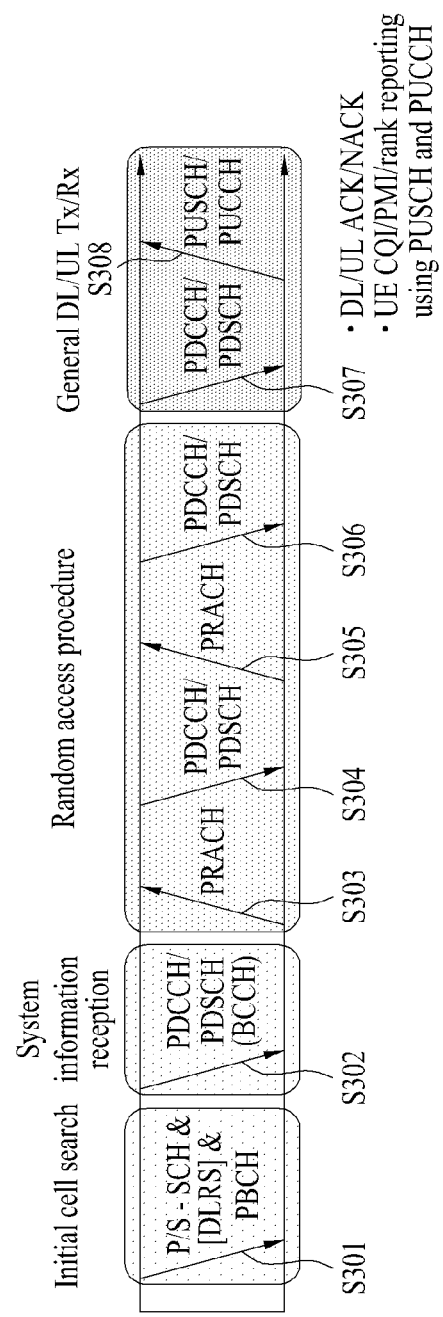
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Control information transmitted by the UE to the eNB through uplink or received by the UE from the eNB through downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
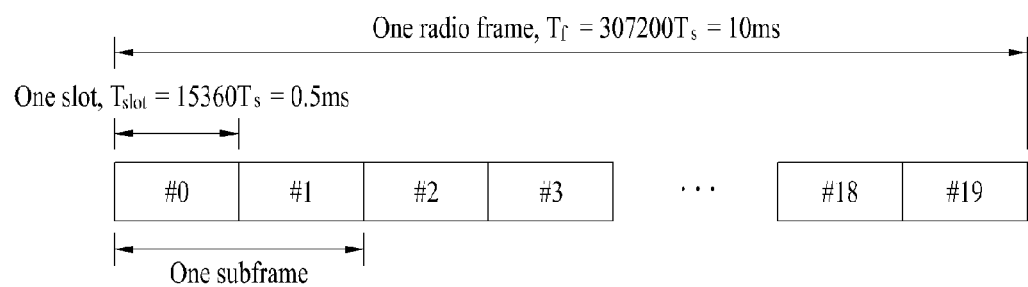
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (327200 $T_s$) and includes 10 equal-sized subframes. Each of the subframes has a length of 1 ms and includes two slots. Each of the slots has a length of 0.5 ms (15360 $T_s$). In this case, $T_s$ denotes sampling time and is represented by $T_s=1/(15 \text{ kHz} \times 2048)=3.2552 \times 10^{-8}$ (about 33 ns). Each slot includes a plurality of OFDM symbols or SC-FDMA symbols in a time domain and includes a plurality of resource blocks in a frequency domain. In the LTE system, one resource block includes 12 subcarriers×7 (or 6) OFDM symbols or SC-FDMA symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
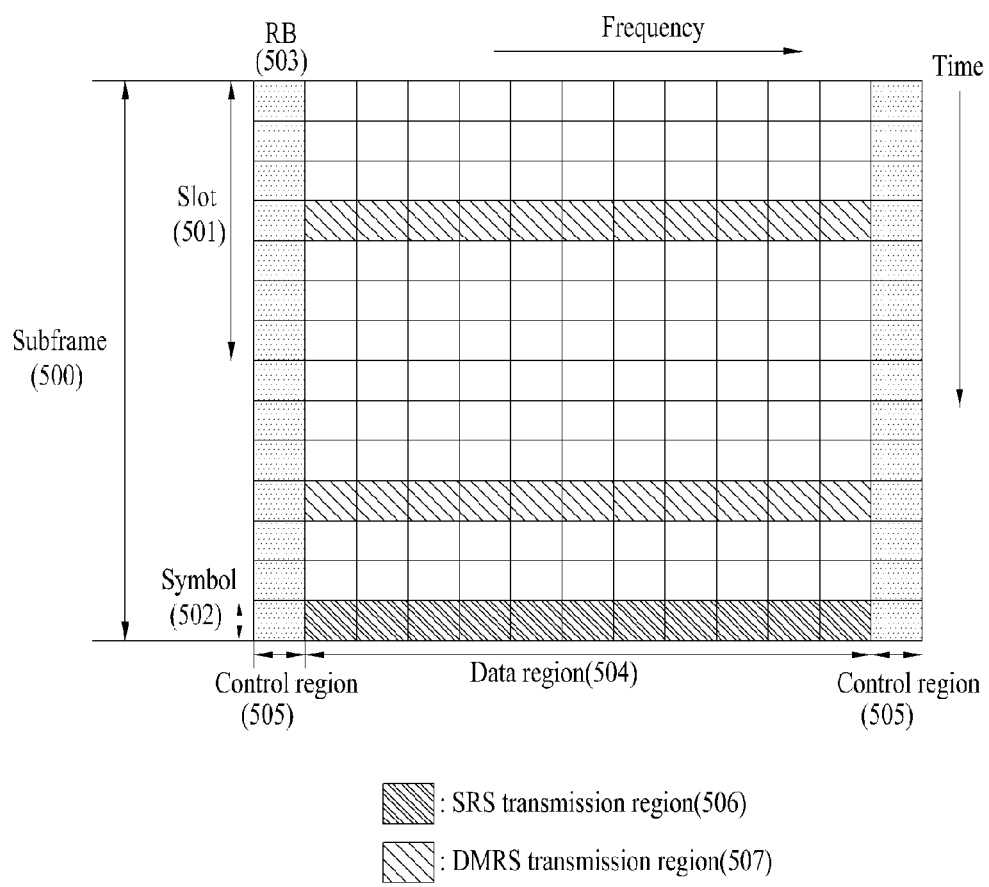
FIG. 5 is a diagram showing the structure of an uplink subframe used in an LTE system.

FIG. 5 is a diagram showing the structure of an uplink subframe used in an LTE system.

Referring to FIG. 5, a subframe 500 having a length of 1 ms, which is a basic unit of LTE uplink transmission, includes two 0.5 ms slots 501. When assuming the length of a normal Cyclic Prefix (CP), each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region refers to a series of communication resources used for transmission of data such as voice and packets transmitted to each UE and corresponds to resources except for a control region in a subframe. The control region refers to a series of communication resources used for transmission of downlink channel quality report from each UE, reception ACK/NACK for a downlink signal, uplink scheduling request, and the like.

As shown in FIG. 5, a region 506 in which Sounding Reference Signals (SRSs) can be transmitted is a duration in which an SC-FDMA symbol located at the last portion on a time axis in one subframe is present and is transmitted through a data transmission band on a frequency axis. SRSs of several UEs transmitted to the last SC-FDMA of the same subframe can be identified according to frequency positions.

An SRS is configured by a Constant Amplitude Zero Auto Correlation (CAZAC) sequence. SRSs transmitted from several UEs are CAZAC sequences ($r^{SRS}(n)=r_{u,v}^{(\alpha)}(n)$) having different cyclic shift values $\alpha$ according to the following Equation 1:

$$\alpha = 2\pi \frac{n_{SRS}^{cs}}{8} \quad \text{[Equation 1]}$$

where $n_{SRS}^{cs}$ is a value configured for each UE by higher layers and is an integer of 0 to 7.

CAZAC sequences, which are generated through cyclic shift from one CAZAC sequence, have a characteristic in that they have a zero-correlation with sequences having cyclic shift values different therefrom. Using such a characteristic, SRSs in the same frequency domain can be identified according to cyclic shift values of CAZAC sequences. An SRS of each UE is allocated on a frequency axis according to a parameter set by a BS. A UE performs frequency hopping of an SRS so that the SRS can be transmitted throughout a total uplink data transmission bandwidth.

Hereinafter, a detailed method for mapping a physical resource for SRS transmission in an LTE system will be described.

To satisfy a transmission power $P_{SRS}$, an SRS sequence $r^{SRS}(n)$ is multiplied by an amplitude scaling factor $\beta_{SRS}$ and the SRS sequence $r^{SRS}(n)$ is mapped starting with $r^{SRS}(0)$ to a Resource Element (RE), the index of which is (k,l), according to the following Equation 2:

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 2]}$$

where $k_0$ denotes a frequency-domain starting point of an SRS and is defined by the following Equation 3:

$$k_0 = k_0' + \sum_{b=0}^{B_{SRS}} 2M_{sc,b}^{RS} n_b \quad \text{[Equation 3]}$$

where $n_b$ denotes a frequency position index. In addition, $k_0'$ for a normal uplink subframe is defined by the following Equation 4 and $k_0'$ for an Uplink Pilot Time Slot (UpPTS) is defined by the following Equation 5:

$$k_0' = (\lfloor N_{RB}^{UL}/2 \rfloor - m_{SRS,0}/2)N_{sc}^{RB} + k_{TC} \quad \text{[Equation 4]}$$

$$k_0' = \begin{cases} (N_{RB}^{UL} - m_{SRS,0}^{max})N_{sc}^{RB} + k_{TC} & \text{if } ((n_f \bmod 2) \times \\ & (2 - N_{SP}) + n_{hf}) \bmod 2 = 0 \\ k_{TC} & \text{otherwise} \end{cases} \quad \text{[Equation 5]}$$

In Equation 4 and Equation 5, $k_{TC}$ is a transmissionComb parameter signaled to a UE through higher layers and has a value of 0 or 1.

Moreover, $n_{hf}$ is 0 for an UpPTS in a first half frame and 1 for an UpPTS in a second half frame.

$M_{sc,b}^{RS}$ is a length of an SRS sequence, i.e. a bandwidth, expressed in the unit of a subcarrier defined by the following Equation 6:

$$M_{sc,b}^{RS} = M_{SRS,b} N_{sc}^{RB}/2 \quad \text{[Equation 6]}$$

In Equation 6, $m_{SRS,b}$ is a value signaled from a BS according to an uplink bandwidth $N_{RB}^{UL}$ as shown in the following Table 1 to Table 4.

To obtain the value $m_{SRS,b}$, a cell-specific parameter $C_{SRS}$, which is an integer of 0 to 7, and a UE-specific parameter $B_{SRS}$, which is an integer of 0 to 3 are needed. The values of the parameters $C_{SRS}$ and $B_{SRS}$ are given by higher layers.

TABLE 1

$b_{hop}$ = 0, 1, 2, 3, values for the uplink bandwidth of $6 \leq N_{RB}^{UL} \leq 40$.

| SRS bandwidth configuration | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop}$ = 0, 1, 2, 3, values for the uplink bandwidth of $40 < N_{RB}^{UL} \leq 60$.

| SRS bandwidth configuration | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop}$ = 0, 1, 2, 3, values for the uplink bandwidth of $60 < N_{RB}^{UL} \leq 80$.

| SRS bandwidth configuration | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop}$ = 0, 1, 2, 3, values for the uplink bandwidth of $80 < N_{RB}^{UL} \leq 110$.

| SRS bandwidth configuration | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, a UE may perform frequency hopping of an SRS so that the SRS can be transmitted throughout a total uplink data transmission bandwidth and such frequency hopping is set by a parameter $b_{hop}$ having a value of 0 to 3 given by higher layers.

If frequency hopping of an SRS is disabled, i.e., if $b_{hop} \geq B_{SRS}$, then the frequency position index $n_b$ has a constant value as shown in the following Equation 7. Here, $n_{RRC}$ is a parameter given by higher layers:

$$n_b = \lfloor 4n_{RRC}/m_{SRS,b} \rfloor \bmod N_b \quad \text{[Equation 7]}$$

Meanwhile, if frequency hopping of an SRS is enabled, i.e. if $b_{hop} < B_{SRS}$, then the frequency position index $n_b$ is defined by the following Equation 8 and Equation 9:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 8]}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Equation 9]}$$

where $n_{SRS}$ is a parameter calculating the number of transmissions of an SRS and is defined by the following Equation 10:

$$n_{SRS} = \begin{cases} 2N_{SP}n_f + 2(N_{SP}-1)\left\lfloor\dfrac{n_s}{10}\right\rfloor + \left\lfloor\dfrac{T_{offset}}{T_{offset\_max}}\right\rfloor, & \text{for 2 ms SRS periodicity} \\ & \text{of TDD frame substance} \\ \lfloor(n_f \times 10 + \lfloor n_s/2\rfloor)/T_{SRS}\rfloor, & \text{otherwise} \end{cases}$$

[Equation 10]

for 2 ms SRS periodicity of TDD frame structure otherwise

In Equation 10, $T_{SRS}$ denotes SRS periodicity, $T_{offset}$ denotes an SRS subframe offset, $n_s$ denotes a slot number, and $n_f$ denotes a frame number.

A UE-specific SRS configuration index $I_{SRS}$ for configuring the SRS periodicity $T_{SRS}$ and the subframe offset $T_{offset}$ is shown below in Table 5 and Table 6 according to FDD and TDD.

TABLE 5

UE Specific SRS Periodicity $T_{SRS}$ and Subframe Offset Configuration $T_{offset}$, FDD.

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

UE Specific SRS Periodicity $T_{SRS}$ and Subframe Offset Configuration $T_{offset}$, TDD.

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

A UE of a conventional LTE system transmits an uplink signal based on one Radio Frequency (RF) power amplifier chain. Especially, when a UE performs uplink transmission using two physical antennas, an open-loop or closed-loop antenna selection scheme which switches one RF power amplifier output to the physical antennas in a time resource region is applied.

Figure 6:
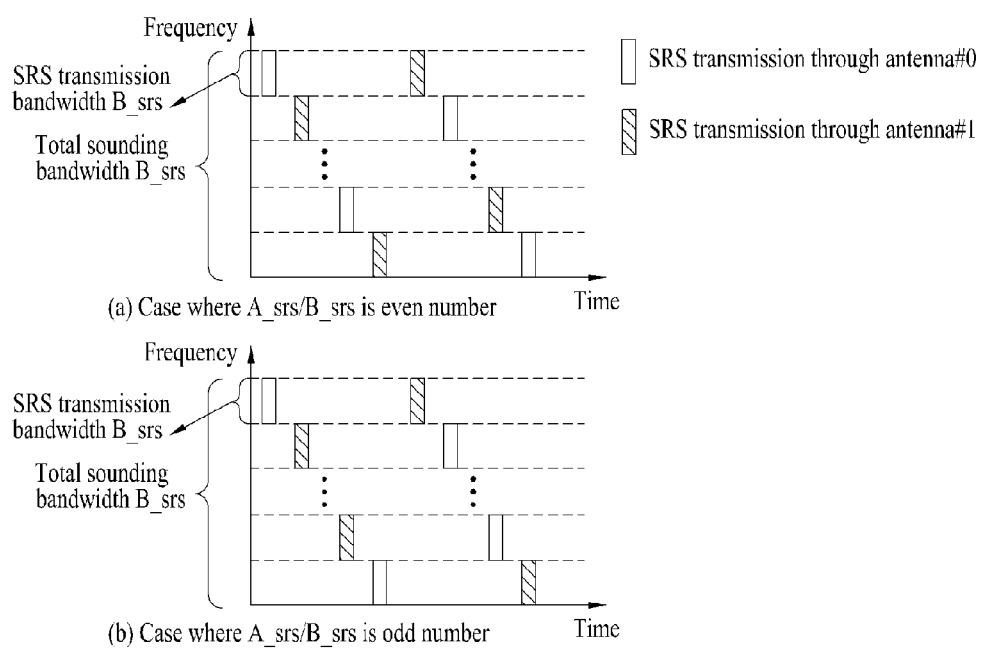
FIG. 6 is a diagram showing a general sounding reference signal transmission method to which a closed-loop antenna selection scheme is applied.

FIG. 6 is a diagram showing a general SRS transmission method to which a closed-loop antenna selection scheme is applied.

Referring to FIG. 6, a method for allocating a frequency resource region of an SRS per antenna at each SRS transmission time point is shown when an SRS transmission bandwidth is less than a total system bandwidth and when a frequency hopping scheme is applied during SRS transmission. If the frequency hopping scheme is not applied during SRS transmission, SRSs are alternately transmitted using individual antennas in the same bandwidth and frequency position per SRS transmission time point.

By contrast, if a UE includes a plurality of transmission antennas and a plurality of RF power amplifier chains as in an LTE-A system and can simultaneously transmit signals to uplink using the plurality of antennas, a conventional antenna selection scheme may encounter the following problems.

First, in an LTE-A system transmitting uplink signals simultaneously using multiple antennas instead of an individual antenna, power amplifiers of antennas which are not used to transmit an SRS in one or more OFDM or SC-FDMA symbols within an arbitrary subframe should be turned off.

Second, transmission power of an antenna transmitting an arbitrary SRS is still restricted to 1/(number of transmission antennas) compared to transmission power using a single antenna.

Therefore, an SRS transmission method which can be applied to an LTE-A system, especially, a multiplexing method of an SRS will be proposed hereinbelow. In an SRS transmission method according to the present invention, uplink signal transmission using a plurality of transmission antennas at an arbitrary time point using a plurality of RF power amplifier chains is considered.

In the present invention, in the case of PUSCH or PUCCH transmission, SRS transmission for antennas or layers used for the PUSCH or PUCCH transmission is performed in the same subframe as a subframe used for PUSCH or PUCCH transmission. As an SRS multiplexing scheme for supporting this, Code Division Multiplexing (CDM), Frequency Division Multiplexing (FDM), or a combination thereof may be considered in an SRS transmission symbol within any subframe.

First, a CDM scheme of an SRS according to the present invention is described. In CDM, a parameter determining multiplexing capacity is the number of available cyclic shift values. The number of available cyclic shift values is determined by the relation between a CP length of an OFDM or SC-FDMA symbol and a delay spread value of a channel. All or some of cyclic shift values demanded for SRS transmission may be explicitly or implicitly signaled from higher layers, for example, an RRC layer or may be signaled through an L1/L2 control channel.

In some cases, a base sequence index or a root index in an SRS sequence may be a parameter determining multiplexing capacity.

Figure 7:
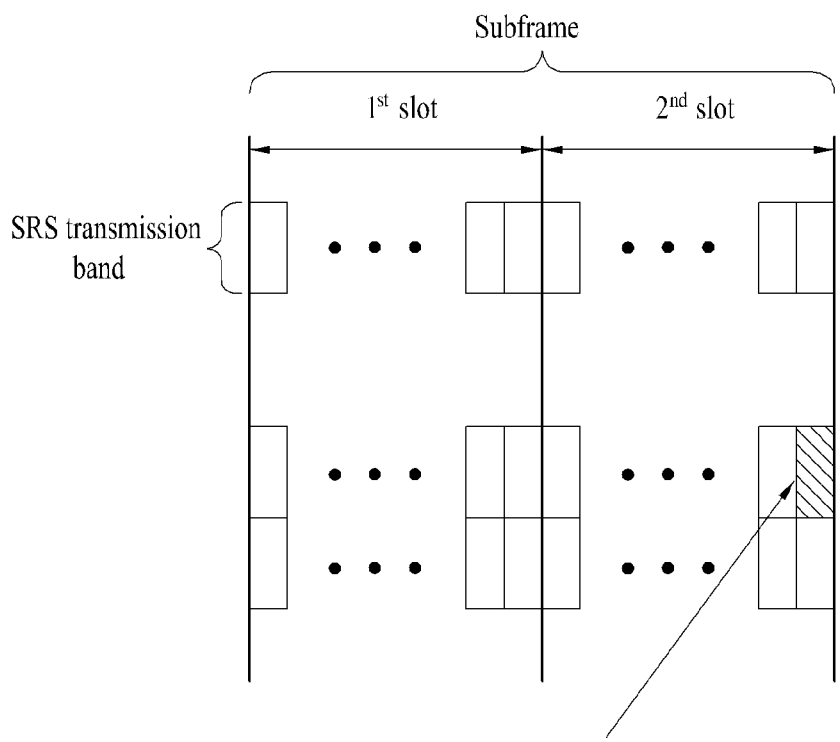
FIG. 7 is a diagram explaining a sounding signal reference signal transmission method in an LTE-A system according to an embodiment of the present invention.

FIG. 7 is a diagram explaining an SRS transmission method in an LTE-A system according to an embodiment of the present invention. Especially, FIG. 7 illustrates an example of multiplexing an SRS in the last OFDM or SC-FDMA symbol of a subframe using a CDM scheme.

Referring to FIG. 7, if M SRSs are to be transmitted, the M SRSs are code division multiplexed to a predetermined SRS transmission bandwidth using different M cyclic shift values (or base sequence indexes). The predetermined SRS transmission bandwidth may have various sizes according to a system bandwidth.

Hereinafter, a detailed CDM scheme according to an embodiment of the present invention will be described. As described previously, the number of cyclic shift values used as a parameter determining multiplexing capacity of a CDM scheme is determined as 8 as indicated by Equation 1.

However, this number is the number of cyclic shift values considering the case of maximum delay spread of a channel model which was considered in an LTE system. If delay spread is less than a channel model which was considered in the LTE system, since a cyclic shift interval can be reduced, the number of cyclic shift values which can be code division multiplexed in one OFDM symbol or SC-FDMA symbol can increase as indicated by the following Equation 11:

$$\alpha = 2\pi \frac{n_{SRS}^{cs}}{N} \quad [\text{Equation 11}]$$

where $n_{SRS}^{cs}$ is a value configured for each UE by higher layers and is an integer of 0 to N−1. Especially, N may be $$\text{floor}\left(\frac{\text{symbol periodicity}}{\text{maximum delay spread}}\right)$$

based on a maximum delay spread value of a channel considered in an LTE-A system or may be $$\text{floor}\left(\frac{\text{symbol periodicity}}{\text{RMS of delay spread}}\right)$$

based on a Root Mean Square (RMS) of a delay spread value. Alternatively, N may be approximately set to $$N \geq \text{floor}\left(\frac{\text{symbol periodicity}}{\text{maximum delay spread}}\right) \text{ or}$$

$$N \geq \text{floor}\left(\frac{\text{symbol periodicity}}{\text{RMS of delay spread}}\right).$$

In this way, the method for increasing the number of available cyclic shift values has an advantage in that resources for SRSs used in different antennas or different UEs can be multiplexed while orthogonality is maintained by assuring orthogonality between codes to which different cyclic shift values are applied in the same root sequence, in the case of less delay spread.

The CDM scheme according to the present invention is desirably applied in an environment of less delay spread, i.e. in a microcell, picocell, or femtocell. Accordingly, during cell establishment, a macrocell may use a cyclic shift value according to Equation 1 or use a cyclic shift value, an interval of which in Equation 11 approximates to an interval of the cyclic shift value in Equation 1. In the microcell, picocell, or femtocell, a method for increasing the number of available cyclic shift values according to Equation 11 may be considered.

Next, an FDM scheme of an SRS according to the present invention is described. In applying the FDM scheme, an SRS transmission bandwidth, and a Repetition Factor (RPF) for determining a subcarrier interval, i.e. density, used for SRS transmission may be considered as a parameter determining multiplexing capacity.

Since an RPF is 2 in an LTE system, resource allocation is discriminated between even-numbered subcarrier indexes and odd-numbered subcarrier indexes in a subcarrier. In addition, a bandwidth through which an SRS is transmitted is defined to have various values according to a total system band. Meanwhile, in an LTE-A system, a discrete comb mapping ratio or an RPF may increase in consideration of transmission using multiple antennas. For example, in the case of 2 transmission antennas, the RPF may be 2 or 4, and in the case of 4 transmission antenna, the RPF may be 2, 4, 6, or 8.

Figure 8:
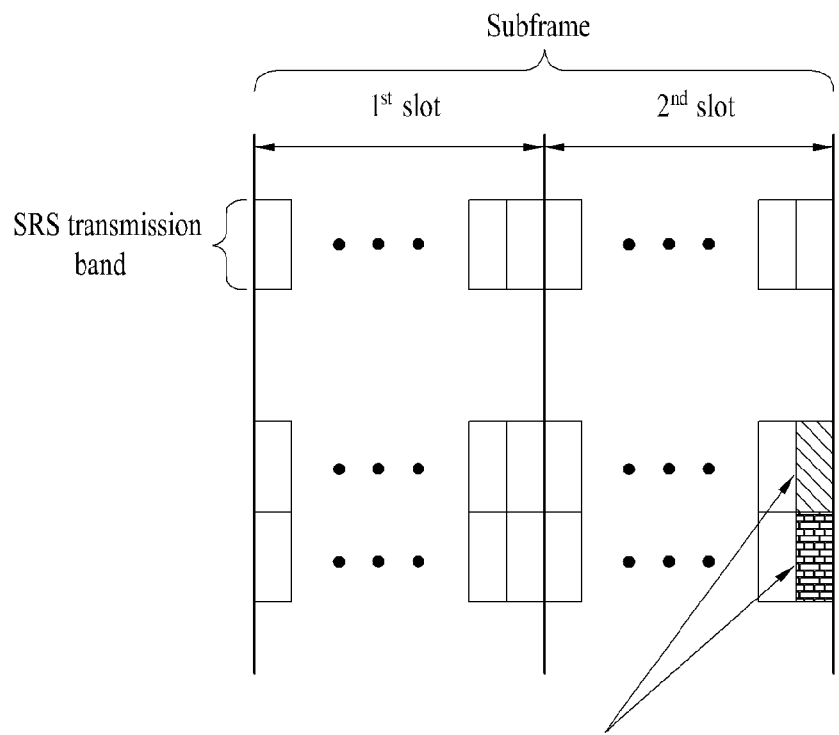
FIG. 8 is a diagram explaining a sounding signal reference signal transmission method in an LTE-A system according to another embodiment of the present invention.

FIG. 8 is a diagram explaining an SRS transmission method in an LTE-A system according to another embodiment of the present invention. Especially, FIG. 8 illustrates an example of multiplexing an SRS in the last OFDM or SC-FDMA symbol of a subframe using an FDM scheme.

Referring to FIG. 8, if M SRSs are to be transmitted, the M SRSs are multiplexed to a frequency axis to have different SRS transmission bandwidths or different comb patterns at the same SRS transmission bandwidth. In FIG. 8, bandwidths through which multiplexed SRSs are transmitted have various sizes with a total system bandwidth as a maximum value. Further, in FIG. 8, SRS transmission bandwidths expressed by distinguishable bands indicate inclusion of an FDM scheme for discrete physical RE comb patterns.

Finally, a combination scheme of CDM and FDM is described. In applying this combination scheme, the above-described CDM and FDM schemes are included and additionally it is necessary to consider a correlation between parameters which determines multiplexing granularity of CDM or FDM and multiplexing capacity.

For example, upon defining the number of available cyclic shift values in relation to the capacity of CDM, configuration of an RPF in relation to the capacity of FDM has an influence on the number of available cyclic shift values. In other words, an increase in an RPF value has the effect of decreasing the number of cyclic shift values.

Figure 9:
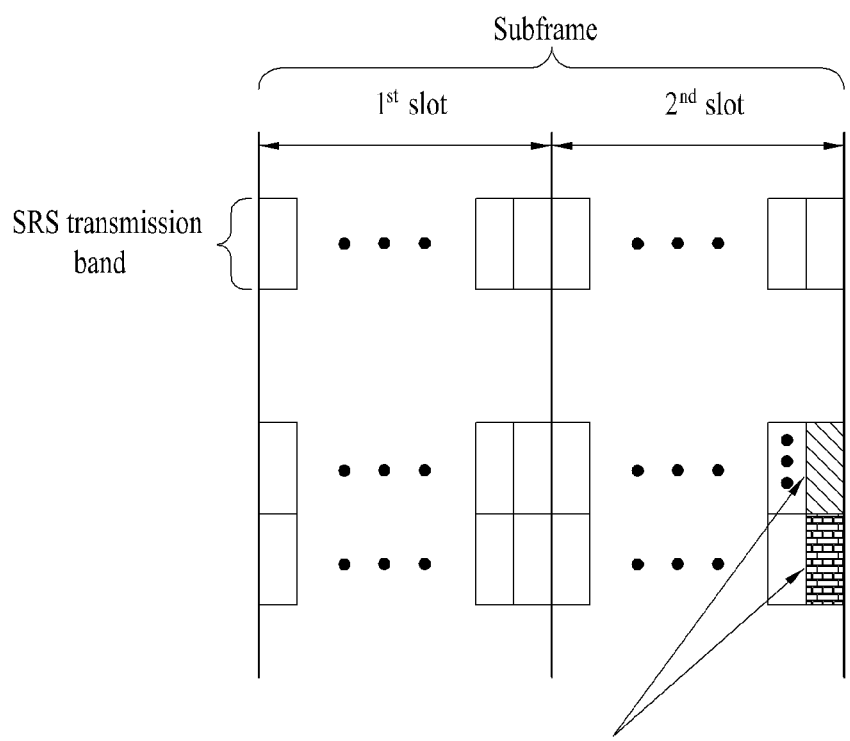
FIG. 9 is a diagram explaining a sounding signal reference signal transmission method in an LTE-A system according to still another embodiment of the present invention.

If a combination scheme of CDM and FDM is applied to SRS transmission multiplexing of UEs of an LTE-A system in consideration of the above circumstance, an SRS transmission method as shown in FIG. 9 may be configured in consideration of multiplexing with a PUSCH or PUCCH.

FIG. 9 is a diagram explaining an SRS transmission method according to still another embodiment of the present invention. Especially, FIG. 9 illustrates an example of multiplexing an SRS in the last OFDM or SC-FDMA symbol of a subframe using a combination of CDM and FDM.

Referring to FIG. 9, M SRSs are to be transmitted, the M SRSs are multiplexed based on a combination of different SRS transmission bandwidths and different cyclic shift values. The respective SRSs may apply FDM or CDM with priority.

Hereinafter, a detailed FDM scheme among the aforementioned multiplexing schemes of an SRS will be proposed. Especially, the FDM scheme according to the present invention is optimized to an LTE-A system while maximally maintaining compatibility with a conventional LTE system.

<Method for Increasing RPF in Correspondence to Number of Antennas>

The first method is to increase an RPF in correspondence to the number of antennas (or the number of layers or the number of ranks) and may consider the following two cases 1) and 2).

1) An RPF of 2 used in an LTE system is used and an increase of an RPF for multiple antennas in an LTE-A system in proportion to the number of antennas (or the number of layers or the number of ranks) may be considered. In other words, an RPF is 2 when the number of antennas is 1, an RPF is 4 for 2 antennas, and an RPF is 8 for 4 antennas.

In this case, the above Equation 2, and Equation 4 to Equation 6, which indicate the method for mapping resources to an SRS and the method for determining the length of an SRS may be modified as indicated by the following Equation 12 to Equation 15, respectively:

$$a_{C \cdot k + k_0, l} = \begin{cases} \beta_{SRS} r^{SRS}(k) & k = 0, 1, \ldots, M_{sc,b}^{RS} - 1 \\ 0 & \text{otherwise} \end{cases}$$ [Equation 12]

$$k'_0 = (\lfloor N_{RB}^{UL}/2 \rfloor - m_{SRS,0}/2)N_{SC}^{RB} + k_{TC} + 2 \cdot l$$ [Equation 13]

$$k'_0 = \begin{cases} (N_{RB}^{UL} - m_{SRS,0}^{max})N_{sc}^{RB} + k_{TC} + 2 \cdot l & \text{if } ((n_f \bmod 2) \times (2 - N_{SP}) + n_{hf}) \bmod 2 = 0 \\ k_{TC} + 2 \cdot l & \text{otherwise} \end{cases}$$ [Equation 14]

$$M_{sc,b}^{RS} = m_{SRS,b} N_{sc}^{RB} / 2L$$ [Equation 15]

In Equation 12 to Equation 15, C denotes a frequency interval or an RPF and has a value of 2L, L denotes the number of transmission antennas (or layers, or ranks), and l denotes an antenna index and is an integer of 0 to 3.

Hereinafter, the cases where a) the number of antennas transmitting SRSs is 4, and b) the number of antennas is 2 will be described in detail based on the above-described Equation 12 to Equation 15.

a) In an LTE system, a minimum resource allocation unit for transmitting SRSs using a single antenna is 4 resource blocks. However, in an LTE-A system, if a distributive FDM scheme is applied for ensuring orthogonality of antennas and if the minimum resource allocation unit of SRSs defined in the LTE system is maintained, 6 REs (4 resource blocks*12 subcarriers/(2*4)) are allocated to each antenna according to Equation 15. Accordingly, in the LTE-A system, a sequence of a 6-unit length is demanded for SRS transmission. The sequence of a 6-unit length may use a CAZAC series sequence (sequence generated by puncturing or extending a ZC sequence), a DFT based sequence, a PN sequence, or other types of sequences which can guarantee orthogonality. Alternatively, the sequence of a 6-unit length may be generated using a computer generation sequence proposed as a reference signal sequence for one resource block (12-unit length) and 2 resource blocks (24-unit length) in a conventional LTE system. However, this is an example for a minimum resource allocation unit of an SRS used in LTE and other resource allocation units of an SRS, except for the minimum unit, may be similarly applied.

Meanwhile, if only a sequence of one minimum resource block (12-unit length) which is being used in the LTE system is used without additionally defining a new sequence of a 6-unit length, a method may be considered for defining sounding band allocation of 8 or more resource blocks using 3-bit information signaled through higher layers as a cell-specific parameter, i.e. $C_{SRS}=\{0,1,2,3,4,5,6,7\}$, and using 2-bit information UE-specifically signalled through higher layers, i.e. $B_{SRS}=\{0,1,2,3\}$.

Alternatively, a multiplexing method may be considered using an FDM scheme in which an RPF of 2 or 4 is applied to two antennas (e.g., indexes 0 and 1) and a CDM scheme in which shift values different from those of the antenna indexes 0 and 1 are applied to the other antennas (e.g. indexes 2 and 3).

Moreover, a method may be considered for maintaining an RFP of 2 as in LTE and simultaneously transmitting SRSs by applying a TDM scheme using pairs of two antennas when uplink transmission is performed with two power amplifiers with respect to 4 antennas through antenna switching. In this case, a sequence of a small unit length according to an increase in the number of antennas may not be necessary. If SRSs are transmitted by applying a TDM scheme through an antenna switching scheme with respect to one or two antennas while uplink transmission is performed using 2 or 4 power amplifiers with respect to 4 transmission antennas, multiplexing may be performed by enabling power amplifiers of unused antennas to operate, i.e. to be turned on or off, through additional signalling (e.g. power control signalling, higher layer signalling through RRC, or signalling using an L1/L2 control channel).

b) Hereinafter, the case where the number of antennas transmitting SRSs is 2 will be described in detail.

As described previously, if a distributive FDM scheme is applied for orthogonality of antennas in an LTE-A system and if the minimum resource allocation unit of SRSs defined in the LTE system is maintained, 12 REs (4 resource blocks*12 subcarriers/(2*2)) are allocated to each antenna according to Equation 15. Accordingly, CDM can be performed between UEs using the same bandwidth by use of a sequence of one resource block (12-unit length) defined in the LTE system. However, this is an example of a minimum resource allocation unit of an SRS defined in LTE and may be similarly applied to other resource allocation units of an SRS except for the minimum unit.

Further, a method may be considered for maintaining an RFP of 2 as in LTE and simultaneously transmitting SRSs by applying a TDM scheme antenna by antenna with respect to 2 antennas through antenna switching. In this case, a sequence of a small unit length according to an increase in the number of antennas may not be demanded. This corresponds to the case where uplink transmission is performed using two transmission antennas and one power amplifier. If a TDM scheme is applied to one antenna while uplink transmission is performed using two transmission antennas each having a power amplifier, multiplexing may be performed by enabling power amplifiers of unused antennas to operate, i.e. to be turned on or off, through additional signalling (e.g. power control signalling, higher layer signalling through RRC, or signalling using an L1/L2 control channel).

2) Unlike the case of 1), a method is considered for maintaining the same RPF as in a conventional LTE system when the number of antennas is 1 and increasing an RPF in proportion to the number of antennas (or the number of layers or the number of ranks) when the number of antennas is 2 or more.

In other words, an RPF is 2 when the number of antennas is 1, an RPF is also 2 for 2 antennas, and an RPF is 4 for 4 antennas.

In this case, the above Equation 2, and Equation 4 to Equation 6, which indicate the method for mapping resources to an SRS and the method for determining the length of an SRS may be modified as indicated by the following Equation 16 to Equation 19, respectively:

$$a_{C \cdot k + k_0, l} = \begin{cases} \beta_{SRS} r^{SRS}(k) & k = 0, 1, \ldots, M_{sc,b}^{RS} - 1 \\ 0 & \text{otherwise} \end{cases} \quad [\text{Equation 16}]$$

$$k_0' = (\lfloor N_{RB}^{UL}/2 \rfloor - m_{SRS,0}/2) N_{SC}^{RB} + k_{TC} \cdot (L \bmod 2) + f(l) \quad [\text{Equation 17}]$$

$$k_0' = \begin{cases} (N_{RB}^{UL} - m_{SRS,0}^{max}) N_{sc}^{RB} + k_{TC} \cdot (L \bmod 2) + f(l) & \text{if}((n_f \bmod 2) \times (2 - N_{SP}) + n_{hf}) \bmod 2 = 0 \\ k_{TC} + f(l) & \text{otherwise} \end{cases} \quad [\text{Equation 18}]$$

$$M_{sc,b}^{RS} = m_{SRS,b} N_{sc}^{RB} / [2 \cdot \{\text{floor}(L/4) + 1\}] \quad [\text{Equation 19}]$$

In Equation 16 to Equation 19, C denotes a frequency interval or an RPF and has a value of 2·{floor(L/4)+1}, L denotes the number of transmission antennas (or layers, or ranks), and l denotes an antenna index and has an integer of 0 to 3.

Hereinafter, the cases where a) the number of antennas transmitting SRSs is 4 and an RPF is 4, and b) the number of antennas is 2 and an RPF is 2 will be described in detail based on the above-described Equation 16 to Equation 19.

a) In an LTE-A system, if a distributive FDM scheme is applied for orthogonality of antennas and if a minimum resource allocation unit of SRSs defined in an LTE system is maintained, 12 REs (4 resource blocks*12 subcarriers/(2*2)) are allocated to each antenna according to Equation 19. Accordingly, in the LTE-A system, a sequence of a 12-unit length is demanded for SRS transmission. In this case, a sequence of one resource block (a 12-unit length) may be generated using a computer generation sequence proposed in a conventional LTE system. However, this is an example for a minimum resource allocation unit of an SRS used in LTE and other resource allocation units of an SRS, except for the minimum unit, may be similarly applied.

Alternatively, a multiplexing method may be considered using an FDM scheme in which an RPF of 2 or 4 is applied to two antennas (e.g., indexes 0 and 1) and a CDM scheme in which shift values different from those of the antenna indexes 0 and 1 are applied to the other antennas (e.g. indexes 2 and 3).

Moreover, a method may be considered for transmitting SRSs by applying a TDM scheme using pairs of two antennas when uplink transmission is performed with two power amplifiers with respect to 4 antennas through antenna switching. In this case, a sequence of a small unit length according to an increase in the number of antennas may not be demanded. If SRSs are transmitted by applying a TDM scheme through an antenna switching scheme with respect to one or two antennas while uplink transmission is performed using 2 or 4 power amplifiers with respect to 4 transmission antennas, multiplexing may be performed by enabling power amplifiers of unused antennas to operate, i.e. to be turned on or off, through additional signalling (e.g. power control signalling, higher layer signalling through RRC, or signalling using an L1/L2 control channel).

b) Hereinafter, the case where the number of antennas transmitting SRSs is 2, i.e. an RPF is 2 will be described in detail.

As described previously, if a distributive FDM scheme is applied for orthogonality of antennas in an LTE-A system and if the minimum resource allocation unit of SRSs defined in the LTE system is maintained, 24 REs (4 resource blocks*12 subcarriers/(2*1)) are allocated to each antenna according to Equation 19. Accordingly, CDM can be performed between UEs using the same bandwidth by use of a sequence of two resource blocks (24-unit length) defined in the LTE system.

However, this is an example of a minimum resource allocation unit of an SRS defined in LTE and may be similarly applied to other resource allocation units of an SRS except for the minimum unit.

Further, a method may be considered for maintaining an RFP of 2 as in LTE and simultaneously transmitting SRSs by applying a TDM scheme antenna by antenna with respect to 2 antennas through antenna switching. In this case, a sequence of a small unit length according to an increase in the number of antennas may not be demanded. This corresponds to the case where uplink transmission is performed using two transmission antennas and one power amplifier. If a TDM scheme is applied to one antenna while uplink transmission is performed using two transmission antennas each having a power amplifier, multiplexing may be performed by enabling power amplifiers of unused antennas to operate, i.e. to be turned on or off, through additional signalling (e.g. power control signalling, higher layer signalling through RRC, or signalling using an L1/L2 control channel).

<Method for Fixing RPF at 3>

A second method is for transmitting SRSs using one comb pattern with respect to transmission of a conventional single antenna and transmitting SRSs using different comb patterns for antennas or antenna groups with respect to transmission using multiple antennas.

Hereinafter, the cases where 1) the number of transmission antennas is 4, and 2) the number of transmission antennas is 2 will be described in detail.

1) When the number of transmission antennas is 4, if a distributive FDM scheme is applied for orthogonality of antennas and if a minimum resource allocation unit of SRSs defined in an LTE system is maintained, 8 REs (4 resource blocks*12 subcarriers/(2*3)) are allocated to each antenna. Accordingly, in the LTE-A system, a sequence of an 8-unit length is demanded for SRS transmission. The sequence of an 8-unit length may use a CAZAC series sequence (sequence generated by puncturing or extending a ZC sequence), a DFT based sequence, a PN sequence, or other types of sequences which can guarantee orthogonality. Alternatively, the sequence of an 8-unit length may be generated using a computer generation sequence proposed as a reference signal sequence for one resource block (12-unit length) and 2 resource blocks (24-unit length) in a conventional LTE system. However, this is an example for a minimum resource allocation unit of an SRS used in LTE and other resource allocation units of an SRS, except for the minimum unit, may be similarly applied.

Alternatively, a multiplexing method may be considered using an FDM scheme in which an RPF of 3 is applied to two antennas (e.g., indexes 0 and 1) and a CDM scheme in which shift values different from those of the antenna indexes 0 and 1 are applied to the other antennas (e.g. indexes 2 and 3). If a minimum resource allocation unit of SRSs defined in the LTE system is maintained, 16 REs (4 resource blocks*12 subcarriers/(3)) are allocated to each antenna. Accordingly, in the LTE-A system, a sequence of a 16-unit length is demanded for SRS transmission. The sequence of a 16-unit length may be a CAZAC series sequence (sequence generated by puncturing or extending a ZC sequence), a DFT based sequence, a PN sequence, or other types of sequences which can guarantee orthogonality. Alternatively, the sequence of a 16-unit length may be generated using a computer generation sequence proposed as a reference signal sequence for one resource block (12-unit length) and 2 resource blocks (24-unit length) in a conventional LTE system. However, this is an example for a minimum resource allocation unit of an SRS used in LTE and other resource allocation units of an SRS, except for the minimum unit, may be similarly applied.

Moreover, a method may be considered for transmitting SRSs by applying a TDM scheme using pairs of two antennas when uplink transmission is performed with two power amplifiers with respect to 4 antennas through antenna switching. In this case, a sequence of a small unit length according to an increase in the number of antennas may not be demanded. If SRSs are transmitted by applying a TDM scheme through an antenna switching scheme with respect to one or two antennas while uplink transmission is performed using 2 or 4 power amplifiers with respect to 4 transmission antennas, multiplexing may be performed by enabling power amplifiers of unused antennas to operate, i.e. to be turned on or off, through additional signalling (e.g. power control signalling, higher layer signalling through RRC, or signalling using an L1/L2 control channel).

2) When the number of transmission antennas is 2, if a distributive FDM scheme is applied for orthogonality of antennas and if a minimum resource allocation unit of SRSs defined in an LTE system is maintained, 16 REs (4 resource blocks*12 subcarriers/(3)) are allocated to each antenna. Accordingly, in the LTE-A system, a sequence of a 16-unit length is demanded for SRS transmission. The sequence of a 16-unit length may be a CAZAC series sequence (sequence generated by puncturing or extending a ZC sequence), a DFT based sequence, a PN sequence, or other types of sequences which can guarantee orthogonality. Alternatively, the sequence of a 16-unit length may be generated using a computer generation sequence used in a conventional LTE system. However, this is an example for a minimum resource allocation unit of an SRS used in LTE and other resource allocation units of an SRS, except for the minimum unit, may be similarly applied.

Similarly, a method may be considered for transmitting SRSs by applying a TDM scheme antenna by antenna with respect to 2 antennas through antenna switching. In this case, a sequence of a small unit length according to an increase in the number of antennas may not be necessary. This corresponds to the case where uplink transmission is performed using two transmission antennas and one power amplifier. If a TDM scheme is applied to one antenna while uplink transmission is performed using two transmission antennas each having a power amplifier, multiplexing may be performed by enabling power amplifiers of unused antennas to operate, i.e. to be turned on or off, through additional signalling (e.g. power control signalling, higher layer signalling through RRC, or signalling using an L1/L2 control channel).

<Method for Equally Distributing Total System Bandwidth in Proportion to Number of Transmission Antennas>

A third method is to equally distribute a total system bandwidth in proportion to the number of transmission antennas so that resources do not collide with each other. In this case, compatibility with a conventional LTE system can be maximized.

1) If a single-carrier characteristic should be maintained like a UE located at a cell boundary, it is necessary to transmit SRSs while maintaining a low Cubic Metric (CM). Therefore, as shown in FIG. 10 to FIG. 13, SRSs may be transmitted so as not to collide with each other between antennas. In the present invention, although a UE located at a cell boundary may indicate a UE at a cell boundary distant from a BS in terms of position, the meaning thereof includes a UE in a circumstance in which maximum power should be transmitted in terms of transmission power.

Figure 10:
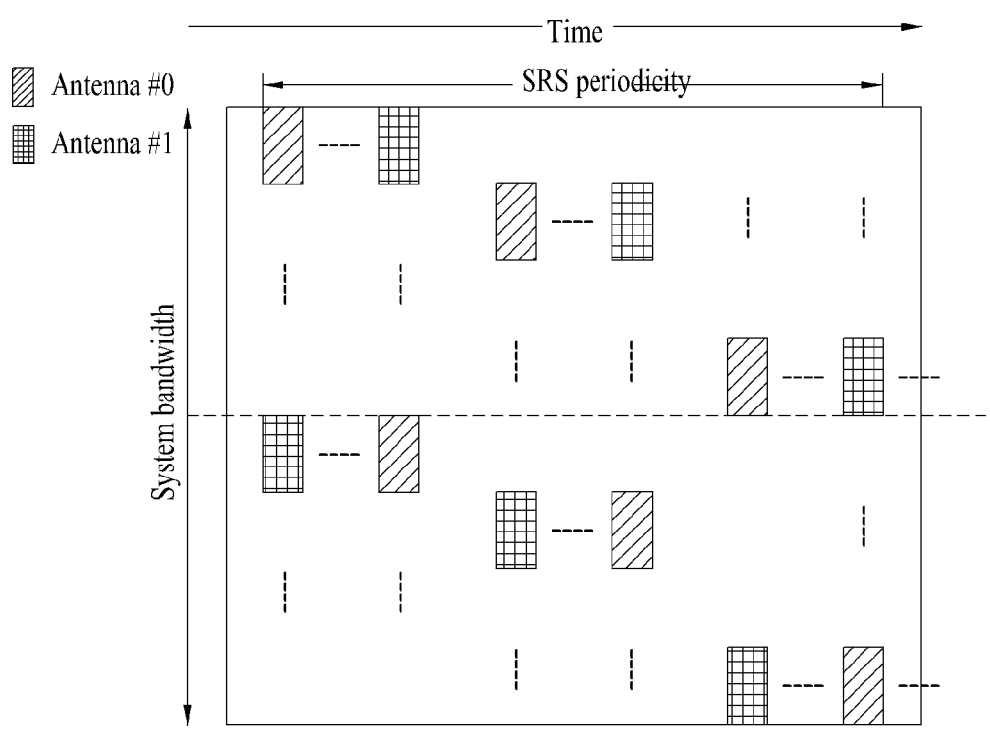
FIG. 10 to FIG. 13 are exemplary diagrams showing sounding reference signal transmission according to embodiments of the present invention.
Figure 11:
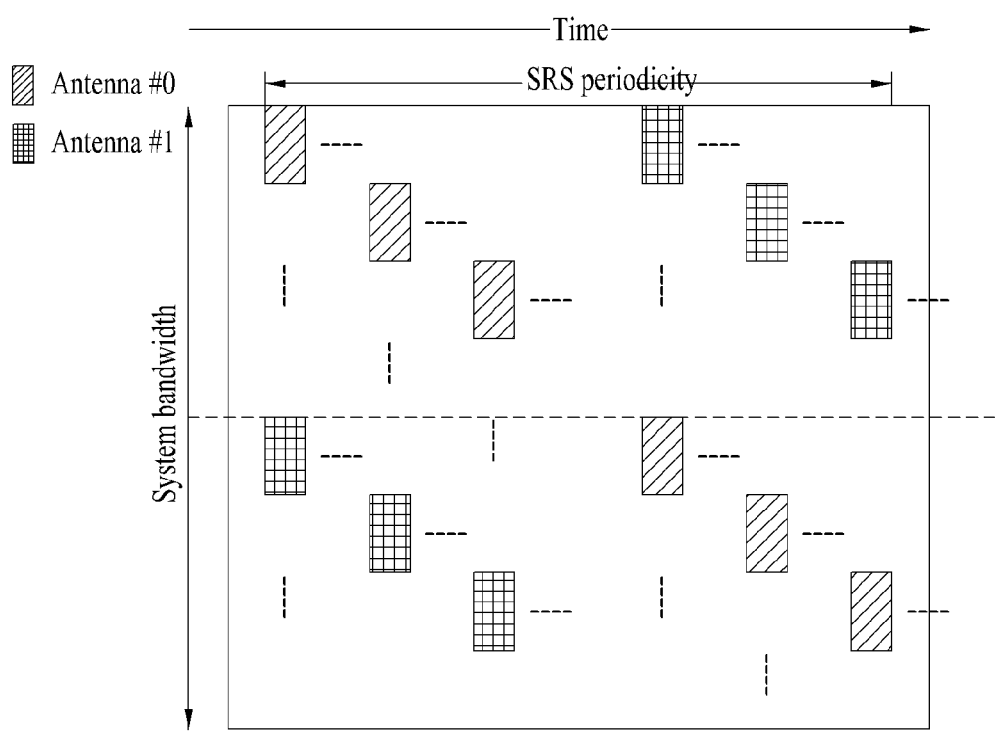
Figure 12:
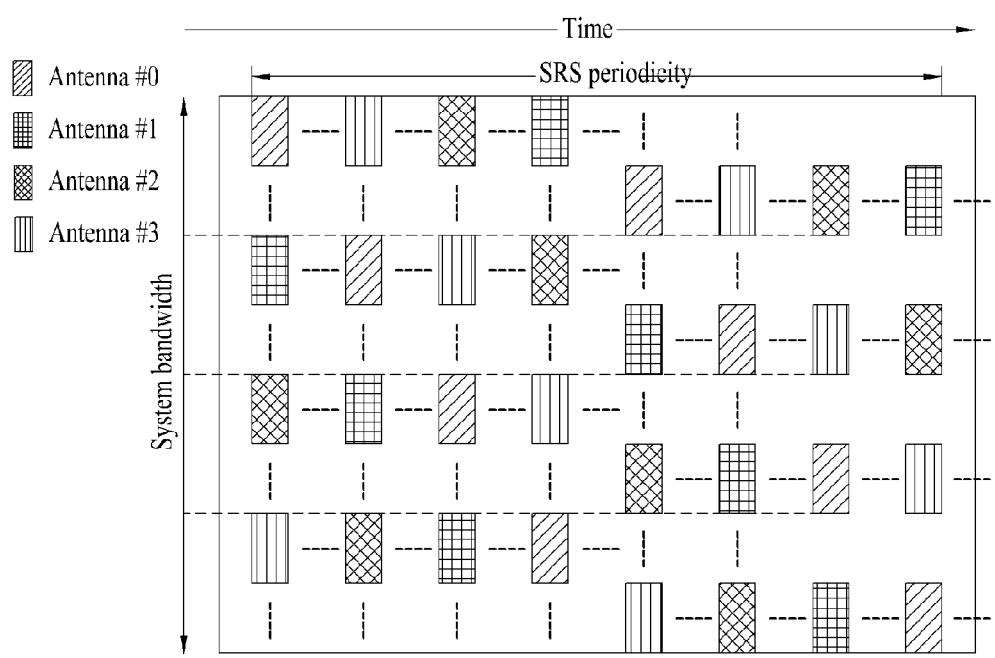
Figure 13:
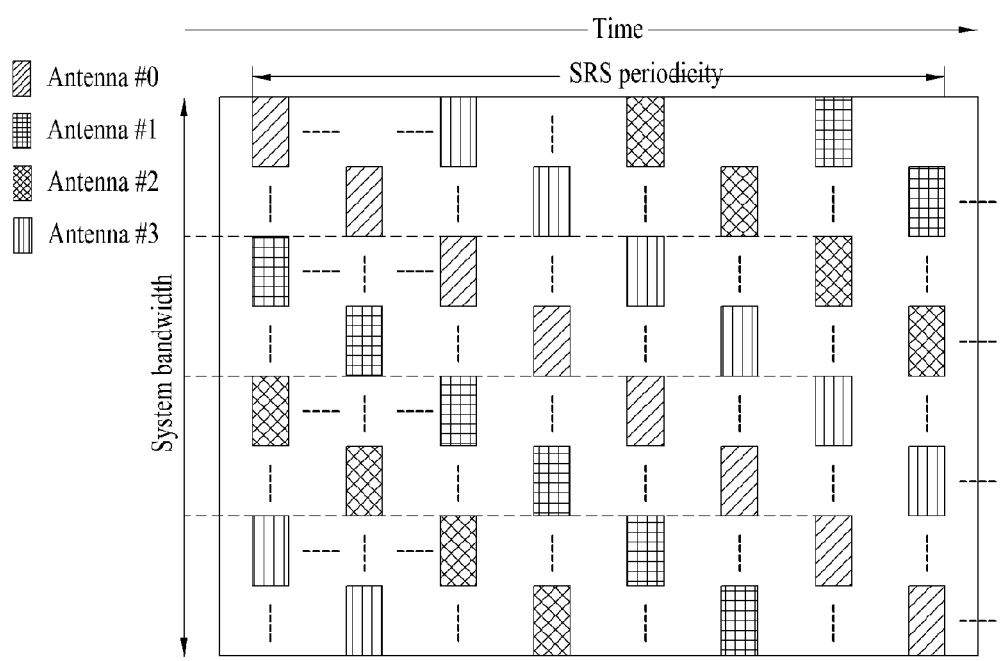

FIG. 10 to FIG. 13 show methods for transmitting SRSs to have a frequency interval of (system bandwidth/number of transmission antennas) between different antennas. Especially, FIG. 10 and FIG. 11 show the methods when the number of antennas is 2 and FIG. 12 and FIG. 13 show the methods when the number of antennas is 4.

2) Meanwhile, if it is not necessary to satisfy a single-carrier characteristic like a UE located in the center of a cell, i.e. if a clustered Discrete Fourier Transform-spread-OFDM (DFTs-OFDM) scheme or a clustered Single-Carrier (SC)-FDMA scheme is used in uplink transmission, it is possible to transmit SRSs throughout different bandwidths even within one symbol during SRS transmission through one antenna. In this case, time resources for sounding a total system bandwidth can be reduced.

Unlike in an LTE system, in an LTE-A system, resources can be discretely allocated using a clustered DFTs-OFDM uplink transmission scheme. Accordingly, a plurality of SRSs for a sounding channel can also be transmitted using the clustered DFTs-OFDM scheme or clustered SC-FDMA scheme.

However, in terms of compatibility with the LTE system, if it is assumed that a frequency starting index is maintained, a total system bandwidth is equally distributed in proportion to the number of transmission antennas. In other words, a method for transmitting a plurality of SRSs may be used while SRSs transmitted from different antennas do not overlap. More desirably, clustered resources may be allocated for SRS transmission based on the number and size of clusters.

Even during SRS transmission using the clustered DFTs-OFDM scheme, it is desirable not to greatly increase a CM. Namely, if the same cyclic shift value and the same base sequence are used for each cluster, a CM value of SRS transmission is considerably increased. Accordingly, a method for allocating different cyclic shift values to clusters or allocating different base sequences may be considered. Alternatively, a method for generating SRSs using a base sequence of the same length as the sum of lengths of clusters to be transmitted and using the same cyclic shift value and dividedly allocating the base sequence or the cyclic shift value to clusters may be considered.

Figure 14:
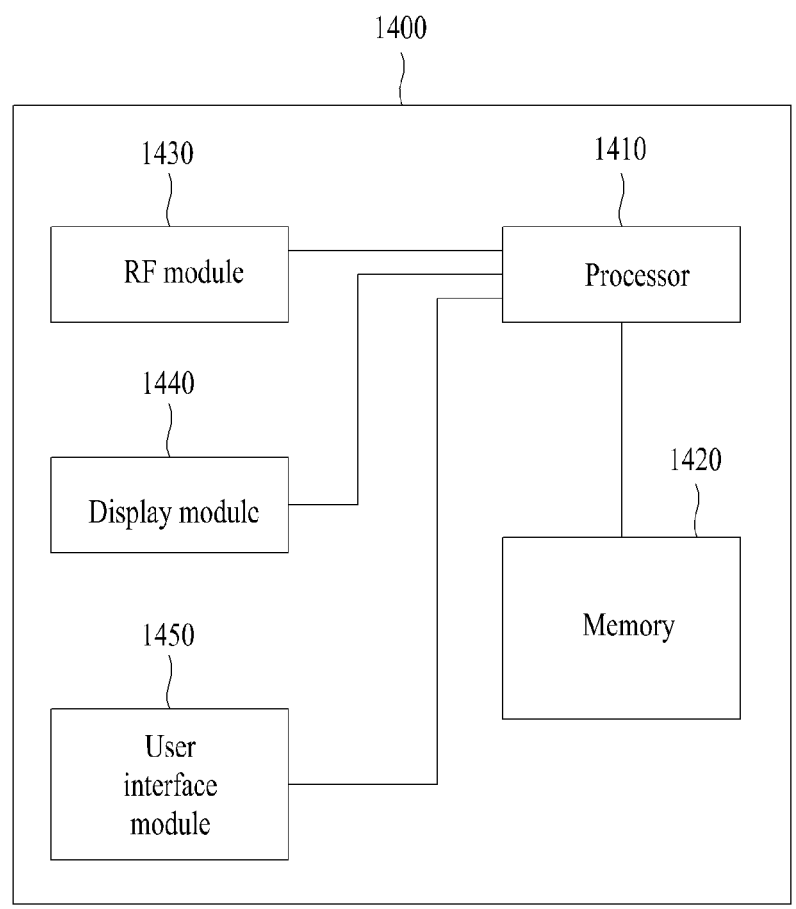
FIG. 14 is a block diagram showing the configuration of a communication transceiver according to an embodiment of the present invention.

FIG. 14 is a block diagram showing the configuration of a communication transceiver according to an embodiment of the present invention. The transceiver may be a part of a BS or a UE.

Referring to FIG. 14, a transceiver 1400 includes a processor 1410, a memory 1420, a Radio Frequency (RF) module 1430, a display module 1440, and a user interface module 1450.

The transceiver 1400 is illustrated for convenience of description and some modules thereof may be omitted. The transceiver 1400 may further include necessary modules. Some modules of the transceiver 1400 may be divided into sub-modules. The processor 1420 is configured to perform an operation according to the embodiments of the present invention described with reference to the drawings.

Specifically, if the transceiver 1400 is a part of a BS, the processor 1420 may generate a control signal to perform a function of mapping the control signal to a control channel configured within a plurality of frequency blocks. If the transceiver 1400 is a part of a UE, the processor 1420 may confirm a control channel indicted thereto for a signal received from a plurality of frequency blocks and extract a control signal from the control channel.

The processor 1420 may perform necessary operations based on the control signal. For details as to the operation of the processor 1420, reference may be made to the contents described in FIG. 1 to FIG. 13.

The memory 1420 is connected to the processor 1410 to store an operating system, applications, program code, and data. The RF module 1430 connected to the processor 1410 converts a baseband signal into a radio signal or converts the radio signal into the baseband signal. To this end, the RF module 1430 performs analog conversion, amplification, filtering up-conversion and performs an inverse process thereof. The display module 1440 is connected to the processor 1410 and displays various information. The display module 1440 may use, but is not limited to, a well-known element such as a Liquid Crystal Display (LCD), a Light Emitting Diode (LED), or an Organic Light Emitting Diode (OLED). The user interface module 1450 is connected to the processor 1410 and may be comprised of a combination of well-known user interfaces such as a keypad and a touchscreen.

The above-described embodiments are combinations of elements and features of the present invention in a predetermined type. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims which are not explicitly dependent on each other can be combined to provide an embodiment or new claims can be added through amendment after this application is filed.

In exemplary embodiments of the present invention, a description is made of a data transmission and reception relationship between a user equipment and a base station. In some cases, a specific operation described as being performed by the base station may be performed by an upper node of the base station. Namely, it is apparent that, in a network comprised of a plurality of network nodes including a base station, various operations performed for communication with a user equipment may be performed by the base station, or network nodes other than the base station. The term 'base station' may be replaced with the term 'fixed station', 'Node B', 'eNode B' (eNB), 'access point', etc. The term 'user equipment' may be replaced with the term 'mobile station', 'mobile subscriber station' (MSS), etc.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

The present invention may be applied to a wireless communication system. More specifically, the present invention is applicable to a method and apparatus for transmitting an SRS in a wireless communication system to which frequency aggregation is applied.

The invention claimed is:

1. A method for transmitting a plurality of sounding reference signals at an user equipment (UE) having multiple antennas in a wireless communication system, the method comprising:
    generating multiple uplink sounding reference signals for transmitting to a base station by the multiple antennas of the UE;
    wherein each of the multiple uplink sounding reference signals has different cyclic shift values, wherein the cyclic shift values are generated based on a number of the multiple antennas, indexes of the multiple antennas and a parameter received by high layer signaling;
    mapping the multiple uplink sounding reference signals to a frequency axis in a last OFDM (Orthogonal Frequency Division Multiplexing) symbol or SC-FDMA (Single Carrier Frequency Division Multiple Access) symbol in an uplink subframe; and
    transmitting the uplink sounding reference signals to the base station using the multiple antennas of the UE;
    wherein the parameter includes a Repetition Factor (RPF) increased in proportion to the number of the multiple antennas.

2. The method of claim 1,
    wherein the RPF is $2 \cdot L$ (where L is the number of multiple antennas).

3. The method of claim 1,
    wherein the RPF is $2 \cdot \{\text{floor}(L/4)+1\}$ (where L is the number of the multiple antennas).

4. The method of claim 1, wherein the mapping includes allocating discontinuously clustered frequency resources to the multiple sounding reference signals in a same OFDM symbol or SC-FDMA symbol.

5. The method of claim 4, wherein base sequences of each of the multiple sounding reference signals are different from each other.

6. An user equipment comprising:
- multiple antennas;
- a processor for generating multiple sounding reference signals for transmitting to a base station by the multiple antennas of the UE and mapping the multiple sounding reference signals to a frequency axis in a last OFDM (Orthogonal Frequency Division Multiplexing) symbol or SC-FDMA (Single Carrier Frequency Division Multiple Access) symbol in an uplink subframe; and
- a transmission module for transmitting the sounding reference signals to the base station using the multiple antennas;
- wherein each of the multiple uplink sounding reference signals has different cyclic shift values;
- wherein the cyclic shift values are generated based on a number of the multiple antennas, indexes of the multiple antennas and a parameter received by high layer signaling; and
- wherein the parameter includes a Repetition Factor (RPF) increased in proportion to the number of the multiple antennas.

7. The user equipment of claim 6, wherein the RPF is 2·L (where L is the number of multiple antennas).

8. The user equipment of claim 6, wherein the RPF is 2·{floor(L/4)+1} (where L is the number of the multiple antennas).

9. The user equipment of claim 6, wherein the processor allocates discontinuously clustered frequency resources to the multiple sounding reference signals in a same OFDM symbol or SC-FDMA symbol.

10. The user equipment of claim 9, wherein base sequences of each of the multiple sounding reference signals are different from each other.

* * * * *